United States Patent [19]
Youngman

[11] Patent Number: 6,049,837
[45] Date of Patent: Apr. 11, 2000

[54] PROGRAMMABLE OUTPUT INTERFACE FOR LOWER LEVEL OPEN SYSTEM INTERCONNECTION ARCHITECTURE

[75] Inventor: Brian Alan Youngman, Cary, N.C.

[73] Assignee: International Business Machines Corporation, Armonk, N.Y.

[21] Appl. No.: 08/987,189

[22] Filed: Dec. 8, 1997

[51] Int. Cl.[7] ............................ G06F 13/18; G06F 13/00; G06F 15/16

[52] U.S. Cl. .................. 709/250; 709/238; 709/230; 710/130

[58] Field of Search .................. 709/250, 230, 709/238; 710/130, 242

[56] References Cited

U.S. PATENT DOCUMENTS

| | | | |
|---|---|---|---|
| 5,107,456 | 4/1992 | Schuur | 710/130 |
| 5,111,423 | 5/1992 | Kopec, Jr. et al. | 395/500 |
| 5,243,273 | 9/1993 | McAuliffe et al. | 324/158 R |
| 5,365,546 | 11/1994 | Koenck et al. | 375/9 |
| 5,371,736 | 12/1994 | Evan | 370/79 |
| 5,459,453 | 10/1995 | Minerd et al. | 340/825 |
| 5,465,106 | 11/1995 | Keech et al. | 345/204 |
| 5,473,758 | 12/1995 | Allen et al. | 395/430 |
| 5,519,701 | 5/1996 | Colmant et al. | 370/60.1 |
| 5,604,870 | 2/1997 | Moss et al. | 395/280 |
| 5,615,344 | 3/1997 | Corder | 395/309 |
| 5,617,040 | 4/1997 | Matthews | 326/38 |
| 5,625,825 | 4/1997 | Rostoker et al. | 710/242 |
| 5,640,399 | 6/1997 | Rostoker et al. | 370/392 |
| 5,802,287 | 9/1998 | Rostoker et al. | 709/250 |
| 5,838,904 | 11/1998 | Rostoker et al. | 709/250 |

OTHER PUBLICATIONS

IBM Technical Disclosure Bulletin, vol. 27, No. 10B, Mar. 1985.

IBM Technical Disclosure Bulletin, vol. 38, No. 04, Apr. 1995.

James Hickey, "A 50 MIP ATM Cell Processor for B–ISDN", IEEE 1992 Custom Integrated Circuit Conference, May, 1992.

*Primary Examiner*—Frank J. Asta
*Assistant Examiner*—Ivan C. Pierce, III
*Attorney, Agent, or Firm*—John D. Flynn; Morgan & Finnegan, L.L.P.

[57] ABSTRACT

A programmable output interface in an Open System Interconnection (OSI) enables a Media Access (MAC) Layer to access a variety of Physical (PHY) Layer implementations without redesign of the interface. The programmable interface includes a control signal generator; an output clock gating generator, and an output polarity control device coupled to the PHY layer. The interface receives media access Start; media access Done signals; a Data Rate clock signal and a data signal. The control signal generator provides control signals for the physical layer components via the polarity control device. The active signal polarity and the relative timing of the control signals are controlled by programmable registers. The output clock gating generator provides clock signals to the physical layer components via the polarity control in response to the Start; Done and Data Rate signals. The output generator clock includes programmable interval registers for the various frame intervals including a User Pause Interval (UPI); Preamble Interval (PI); User Send Interval (USI), etc. The polarity control provides the correct signal polarity for each control, clock, and data signal.

26 Claims, 8 Drawing Sheets

PROGRAMMABLE OUTPUT INTERFACE FOR LOWER LEVEL OPEN SYSTEM INTERCONNECTION ARCHITECTURE

BACKGROUND OF INVENTION

1. Field of Invention

This invention relates to communication devices. More particularly, the invention relates to communication interfaces between Media Access (MAC) and Physical (PHY) layers in Open System Interconnection (OSI) architecture.

2. Description of Prior Art

To communicate between MAC and PHY layers, a data interface is defined. The interface definition is sometimes determined by standards, but is more often determined by hardware developers as a matter of convenience. For example, the IEEE 802.14 Standard for Cable-TV Based Broadband Communication Network being developed through the Institute of Electrical and Electronic Engineers, has proposed numerous proposals for lower level protocols including the MAC and PHY layers. As a result an Application Specific Integrated Circuit (AISC) developed for a particular protocol may be obsolete when a new PHY interface is defined. The ASIC redesign tends to be costly, time-consuming and delays the introduction of PHY hardware improvements. Accordingly, a need exists for a data interface which can be programmed to serve a wide variety of PHY layer interface implementations without redesign of the interface and related ASIC devices.

Prior art related to data interfaces includes the following: U.S. Pat. No. 5,243,273 issued Sep. 7, 1993, discloses a general purpose, reconfigurable system for processing serial bit streams. The system contains one or more reconfigurable bit processors which maybe connected together in a building block fashion to perform low-level processing on serial data received from or sent to a personality module. One of a plurality of serial test sequences receives or sends data from/to the reconfigurable bit processor; provides a user programmable means to control the application and reception of test patterns to and from a channel; and interfaces to the user through a system controller.

U.S. Pat. No. 5,365,546 issued Nov. 15, 1994, discloses an interface device including a programmable memory for storing a number of reference values which allow the interface device to be configured to normalize data signals and control sequences in accordance with operating characteristics of any one of a number of available transceiver modules. The stored reference value control timing sequences for initiating and shutting down a transmit cycle, for storing predetermined maximum deviation values for the modulation bias signal of transmitted data messages, and for demodulating received signals.

U.S. Pat. No. 5,459,453 issued Oct. 17, 1995, discloses an interface connector device for interconnecting a plurality of input/output devices including a signal bus connected to a control and to the input/output devices for multiplexing the signals between the control and the input and output devices. Each of the interface and connector devices includes address recognition circuitry as well as programmable configuration selection logic to configure the connector device to respond to a variety of input/output devices. The signal bus and connector devices are further adapted to recognize and convey various levels of signals, for example, different voltages levels representing control information, framing signals, and diagnostic command signals.

U.S. Pat. No. 5,465,106 issued Nov. 7, 1995, discloses a generic driver interface including a configurable digital circuit card that has programmable logic functions and I/O connectors to provide the capability of implementing many new or old circuit designs without re-etching the circuit card. The circuit card utilizes a programmable gate array, bi-directional programmable I/O driver, and an EEPROM to provide for reconfiguration of the circuit card upon reset. The logic functions and I/O pins of the circuit card are programmable to allow emulation of old designs and implementation of a new design without the need to physically modify the card. The configuration program of the circuit card is stored in the EEPROM which has edge-programmability to eliminate the need of removing the EEPROM prior to programming.

U.S. Pat. No. 5,473,758 issued Dec. 5, 1995, discloses a microcontroller device adapted to be programmed using digital command words or other bit patterns applied as inputs after installation of the device in a circuit. The system is controlled by the device to have its programming pins isolated from the system to avoid effects on system operation while the programming is taking place. A serial/parallel programming interface between the pins and the program memory enables shifting of output pins between programming mode and normal mode without dedicating input/output pins for programming mode.

U.S. Pat. No. 5,519,701 issued May 21, 1996, discloses a programmable interface for defining and dynamically configuring a multiple circuit FIFO storage means to include other parameters useful in the management of data transferred between a host bus and a network.

U.S. Pat. No. 5,604,870 issued Feb. 18, 1997, discloses an interface device for coupling a peripheral controller to a host computer. The interface device includes an emulated Universal Asynchronous Receiver/Transmitter (UART) to take advantage of existing host operating systems arranged to accept and communicate with a PCMCIA compatible or other compliant peripheral function without sacrificing physical space, material cost or functionality of the peripheral function.

U.S. Pat. No. 5,111,423 issued May 5, 1992, discloses a programmable interface for use between a communication bus in a computer system and a peripheral circuit in the computer system. The peripheral circuit card has configuration registers for indicating to the communication system via the communication bus various characteristics of the circuit card. The programmable interface may be customized by the user for any particular peripheral circuit card design.

U.S. Pat. No. 5,371,736 issued Dec. 6, 1994, discloses a universal protocol communications interface which can be either reconfigured or reprogrammed to handle communications among communication devices operating under a variety of different bit-oriented communication protocols.

U.S. Pat. No. 5,617,040 issued Apr. 1, 1997, discloses an integrated circuit with programmable output drive/program pads. The output drive/program pads are programmed by either connecting a resistor from one of the output paths to a positive voltage rail or to a negative voltage rail or by allowing the node to float. Accordingly, a three state programming input is realized in a programming mode.

U.S. Pat. No. 5,615,344 issued Mar. 25, 1997, and having a filing date of Nov. 12, 1992, discloses a reconfigurable interface circuit between a peripheral device and a computer device which reconfigures an interface bus according to a flexibly defined signal between the computer and the peripheral device. The interface further includes means for providing device specific information to reconfigure the reconfigurable interface circuit and to provide the peripheral device interface circuit.

IBM Technical Disclosure Bulletin, Vol 27, No. 10B, March 1995, pages 6323–4 discloses a technique for interfacing a Programmable Communications Processor (PCP) to a host processing system to increase the flexibility and versatility of host systems requiring compatibility with many communication protocols such as SDLS, HDLC, etc. The PCP may be programmed with the desired communication protocol thereby freeing the host system for higher level activities.

None of the prior art, alone or in combination, show or suggest a programmable output interface in an Open System Interconnection (OSI) architecture for a Cable-TV Broadbased Communication Network which enables a MAC layer to access a variety of PHY layer implementations without redesign of the interface and the related ASIC device.

SUMMARY OF INVENTION

An object of the invention is a programmable output interface and method for lower level protocols in an Open System Interconnection (OSI) architecture.

Another object is a programmable output interface enabling an MAC layer to access a variety of PHY layer implementations in an OSI.

Another object is a programmable output interface and method enabling a MAC layer to access a variety of PHY layer implementations without redesign of the interface and related ASIC devices.

Another object is a programmable output interface and method which supports the I.E.E.E. 802.14 Standard.

Another object is a programmable output interface and method providing alternate clocks for the movement of data through the interface.

Another object is a control signal generator using programmable registers to set the active level of control signals and relative timing of control signals in a programmable output interface for a MAC layer in an OSI.

Another object is a output clock gating generator using programmable registers to set timing intervals for and the location of a preamble in a data frame transitioning a programmable output interface for a MAC layer in an OSI.

Another object is an output clock generator providing a free running clock and a gated clock for movement of data through a programmable output interface.

Another object is a an output clock gating generator providing preamble intervals, send intervals, pause intervals, in a data frame transitioning a programmable output interface.

These and other objects, features and advantages are achieved in a programmable output interface for a MAC layer in an OSI. The interface includes a control signal generator and an output clock gating generator coupled through an output polarity control device to a Physical Layer (PHY). The interface receives media access start; media access done signals; a data rate clock from a local area network and a data signal from a communication device coupled to the OSI. The control signal generator provides control signals for the PHY layer components via the polarity control. Examples of the control signals include a carrier on; modulator data enable; modulator clock enable; and data write clock. A media access end signal is provided from the output clock gating generator. The active level and the relative timing of the control signals are controlled by programmable registers in the control signal generator and output polarity control. The output clock gating generator provides clock signals to the physical components via the output polarity control in response to the start; done; and data rate clock signals from the local area network. The clock signals comprise a TSTART; gated transmit clock; transmit free-running clock which control the movement of data through the interface and a transmit data signal having an adjustable preamble and padding value when the absence of data occurs. The output clock gating generator includes programmable interval registers for various frame intervals including a User Pause Interval (UPI); Preamble Interval (PI); and User Send Interval (USI). The polarity control provides the correct signal polarity for the module data enable; module enable clock; the gated transmit clock signals to a modulator in the PHY layer. Optionally, the transmit data; transmit clock frame; and TSTART signals are supplied to an encoder in the PHY layer which encodes the data to the modulator.

DESCRIPTION OF DRAWINGS

The present invention will be further understood from the following detailed description of a preferred embodiment taken in conjunction with the appended drawing, in which.

DESCRIPTION OF PREFERRED EMBODIMENT

Figure 1:
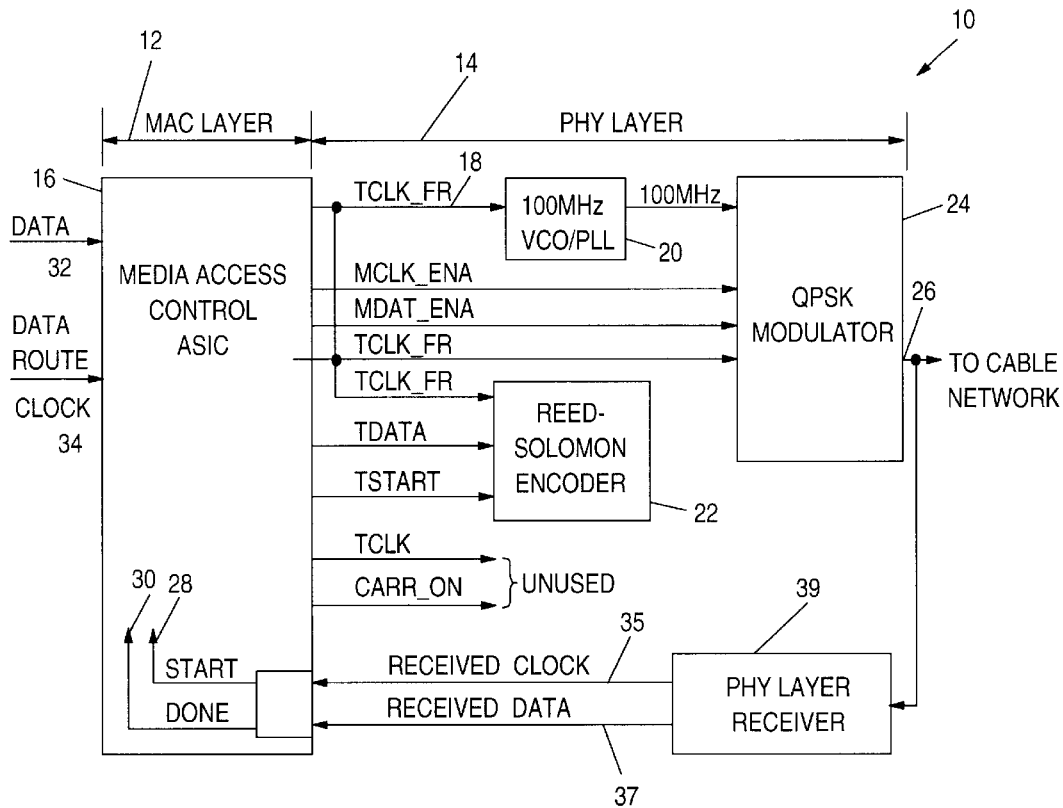
FIG. 1 is a block diagram of a MAC layer and a PHY layer in an OSI supporting a Cable-TV Based Broadband communication network and incorporating the principles of the present invention.

In FIG. 1, a data link interface 10 includes a MAC layer 12 interfacing with a PHY layer 14 in an Open System Interconnection (OSI). A description of an OSI appears in the publication "Computer Networks, Second Edition" by A. S. Tannenbaum, published by Prentice Hall, Inc., Englewood Cliffs, N.J. 07632, 1989, Chapter 1–9 (ISBN 0-13-162959-X) and is fully incorporated herein by reference. The MAC layer 12 is implemented in a Media Access Control device 16 fabricated in an Application Specific Integrated Circuit (ASIC) and incorporates a programmable output interface (see FIG. 2) which provides output signals 18 (as will be described hereinafter) to the PHY layer 14. In one example of a PHY layer embodiment 39, the output signals 18 are coupled to a 100 Mhz. oscillator 20; a Reed-Solomon Encoder 22; and a modulator 24 coupled to a network 26, for example, a cable network, as part of the Cable-TV Based Broadband communication network described in the I.E.E.E. 802.14 Standard. The Media Access Control device 16 is responsive to a data signal 32 from a communication device coupled to the higher layers of the OSI. The device 16 is further responsive to a data rate clock 34, a received network clock 35 and received network data 37 from a PHY layer 39 and generates a media start signal 28 and a media "done" or end signal 30. The PHY layer receiver 39 is coupled through the network 26 to a network programming control unit in a local area network (not shown). Details of a local area network are described in a publication entitled "LAN Operating Systems" by M. Day et al, published by New Riders Publishing, Carmel Indiana, 1993, Chapters 1–18 and incorporated herein by reference.

FIG. 1 demonstrates the use of a programmable output interface 40 with one example of a PHY implementation. This implementation uses the free-running clock option provided by the programmable output interface and does not require a Carrier On Control signal. The TCLK and Carr On signals are shown for completeness but are unused in this example of a PHY implementation.

Figure 2:
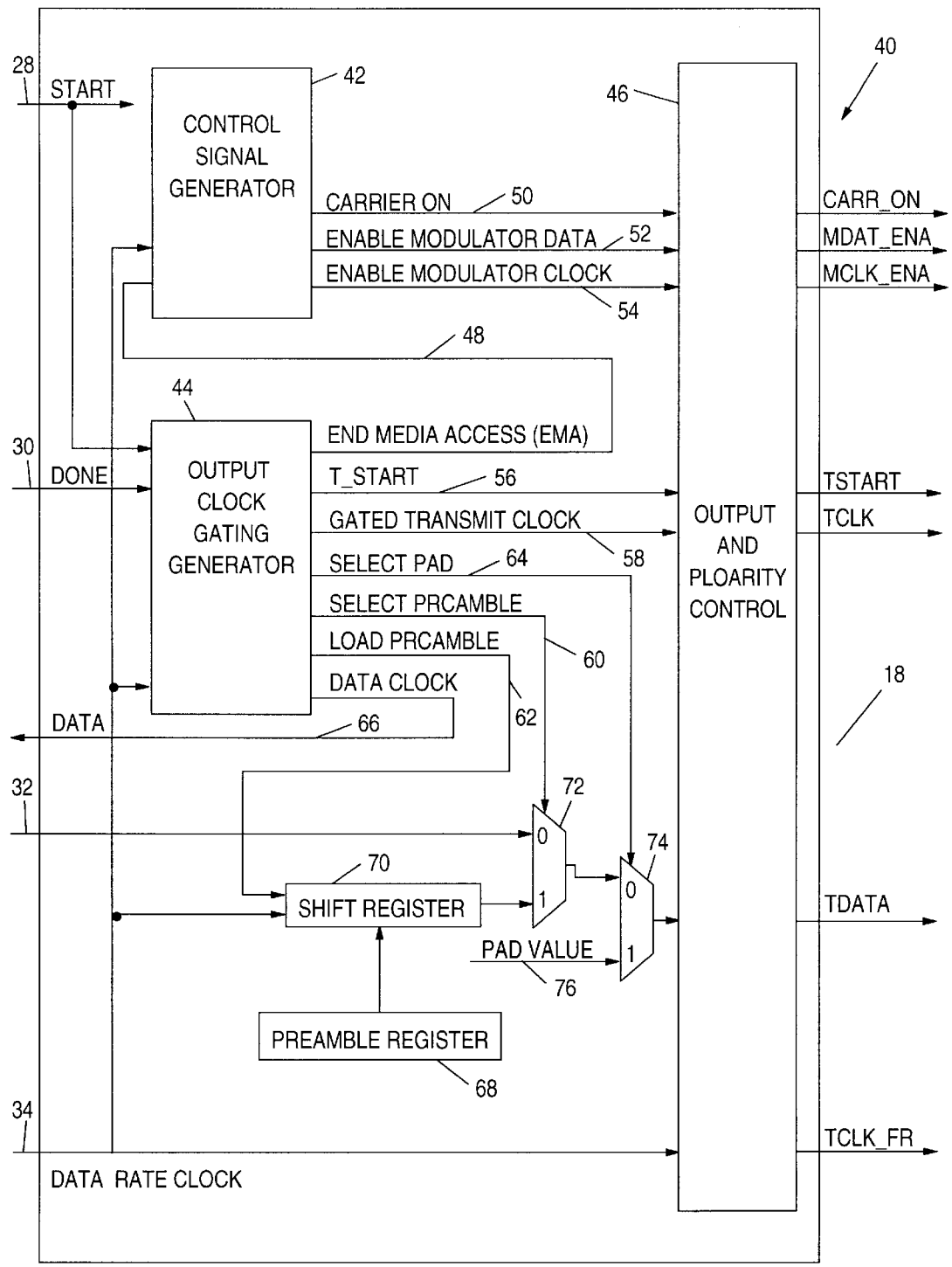
FIG. 2 is a block diagram of a programmable output interface in the MAC layer device of FIG. 1.

In FIG. 2, a Programmable Output Interface (POI) device 40 is included in the media access control device 16 (see FIG. 1) for purposes of generating control and timing output signals 18 to the Physical (PHY) layer. The interface includes a control signal generator 42 and an output clock gating generator 44 coupled to the PHY layer 14 through an output polarity control unit 46. The generator 42 is responsive to the "START" signal 28; the Data Rate clock 34 and receives an "End Media Access Signal" 48 from the clock gating generator 44. The generator 42 provides a Carrier "ON" signal 50; an Enable Modulator Data signal 52 and an Enable Modulator Clock signal 54 to the polarity control device 46.

The output clock gating generator is responsive to the "START" signal; the "DONE" signal 30; and the Data Rate clock 34 and provides timing interval signals to the PHY layer via the polarity control device 46. The timing interval signals include the "End Media Access signal" 48 to the generator 42; a TSTART signal 56; a Gated Transmit Clock 58 and the Data signal 32. The output clock gating generator 44 further provides a "Select" and "Load" Preamble signals 60, 62 for inserting a preamble into the data stream at the location of a Preamble Interval (PI) (See FIGS. 8 or 9) in a data frame; a "Select Pad" signal 64 for providing a pad value in the data frame when the absence of data occurs in the frame and a Data Clock signal 66 which is returned to the data source for synchronizing purposes.

A programmable preamble register 68 and a shift register 70 responsive to the Data Rate Clock 34 adjust the load preamble interval in the data frame. The output of the shift register is combined with the Data Signal 32 and the Select Preamble signal 60 in a multiplexer 72. The output of multiplexer 72 is supplied to a multiplexer 74 for combining the preamble adjusted data signal 32; the Select Pad signal 64 and a pad value 76 for the number of pad values entered into the data frame when data is absent in the data frame. The output of the multiplexer 74 is provided as an input to the polarity control device 46 which provides the interface signals 18 to the PHY layer.

Figure 3:
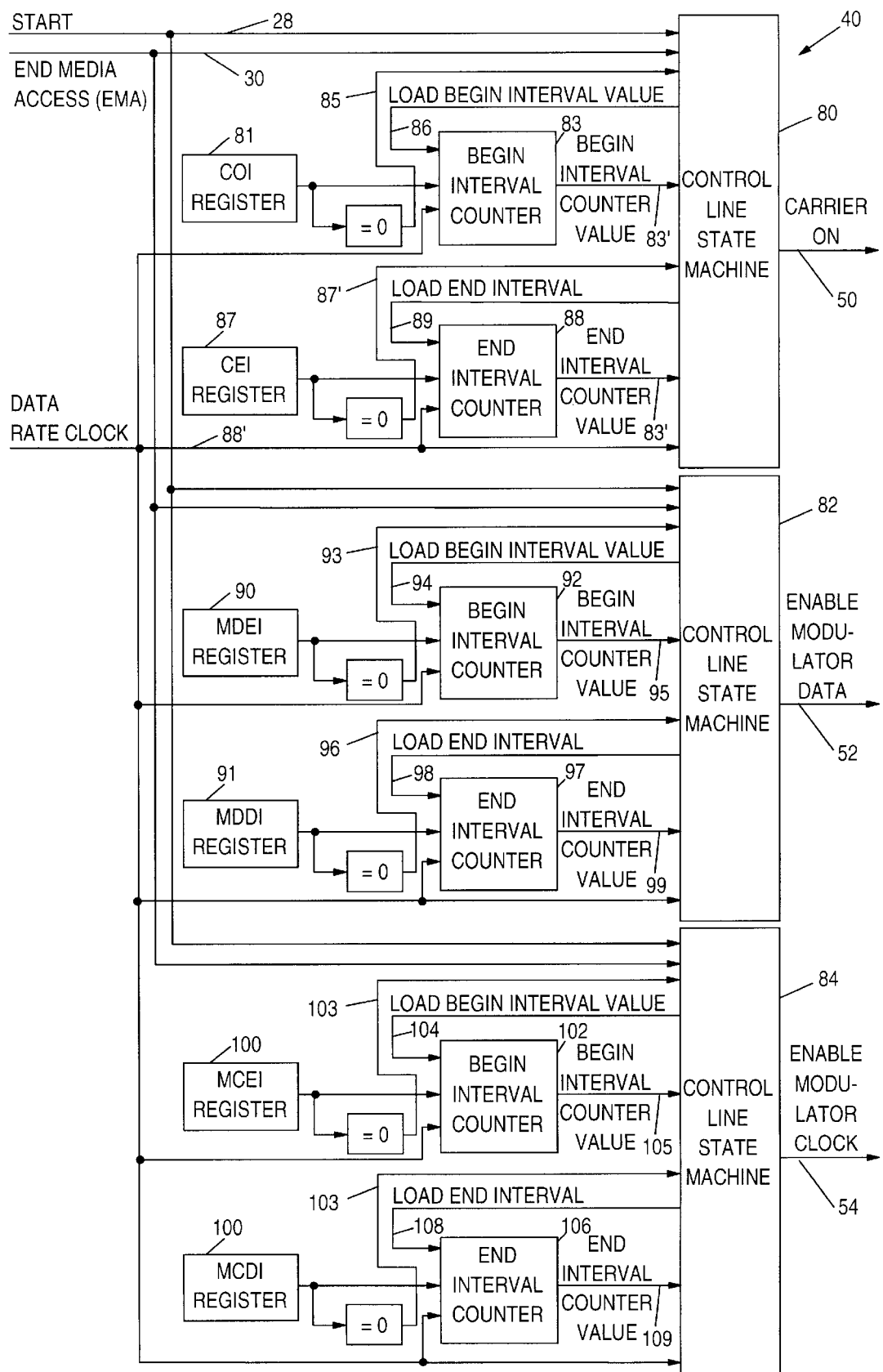
FIG. 3 is a block diagram of a control signal generator in the programmable output interface of FIG. 2.

In FIG. 3, the control signal generator 40 includes control state machines 80, 82 and 84 for generating the carrier on 50; enable modulator data 52; and enable modulator clock 54 signals, respectively, with input to the polarity control unit 46.

The state machine 30 is controlled by programmable Carrier On Interval (COI) 81 and Carrier Extinguish Interval (CEI) 87 registers, and the "Start" 28; "Done" 30; and Data Rate Clock 34 signals. The register 81 provides an input to a Begin Interval Counter 83 and a "Begin Interval Value Equals Zero" indication 85 to the state machine 80. The counter 83 receives a "Load Begin Interval Value" 86 from the state machine 80 and provides a "Begin Interval Counter Value" 83' to the state machine.

The register 87 provides an "End Interval Value Equals Zero" indication 87' to the state machine 80 and an input to an End Interval Counter 88 which receives a "Load End Interval Value" signal 89 from the state machine 80 and provides an "End Interval Counter Value" 88' to the state machine 80.

The state machine 82 is controlled by programmable Modulator Data Enable Interval (MDEI) register 90 and Modulator Data Disable Interval (MDDI) register 91. The MDEI provides inputs to a Begin Interval Counter 92 and a "Begin Interval Value Equals Zero" indication 93 to the state machine 82. The counter 92 receives a "Load Begin Interval Value" signal 94 from the state machine 82 and provides a "Begin Interval Counter Value" 95 to the state machine 82.

The MDDI 91 provides a "Begin Interval Value Equals Zero" indication 96 to the state machine 82 and an input to an End Interval Counter 97 which receives a "Load End Interval" signal 98 from the state machine 82 and provides an "End Interval Counter Value" 99 to the state machine 82.

The state machine 84 is controlled by programmable Modulator Clock Enable Interval (MCEI) register 100 and Modulator Clock Disable Interval (MCDI) register 101. The register 100 provides an input to a Begin Interval Counter 102 and a "Begin Interval Value Equals Zero" indication 103 to the state machine 84. The Begin Interval Counter 102 which receives a "Load Begin Interval Value" signal 104 from the state machine 84 and provides a "Begin Interval Counter Value" 105 to the state machine 84.

The MCDI register 101 provides an input to an End Interval Counter 106 and an "End Interval Value Equals Zero" indication 107 to the state machine 84. The counter 105 receives a "Load End Interval Value" signal 108 from the state machine 84 and provides an "End Interval Counter Value" 109 to the state machine 84.

The operation of the control line state machines will now be described in conjunction with FIG. 4. State machines are examples of sequential logic circuits described, for example in the "Encyclopedia of Computer Science—Third Edition" by A. Ralston et al., published by Van Norstrand Rheinhold, NY, N.Y., 1983, Pages 1191–1195 (ISBN 0-442-27679-6).

Figure 4:
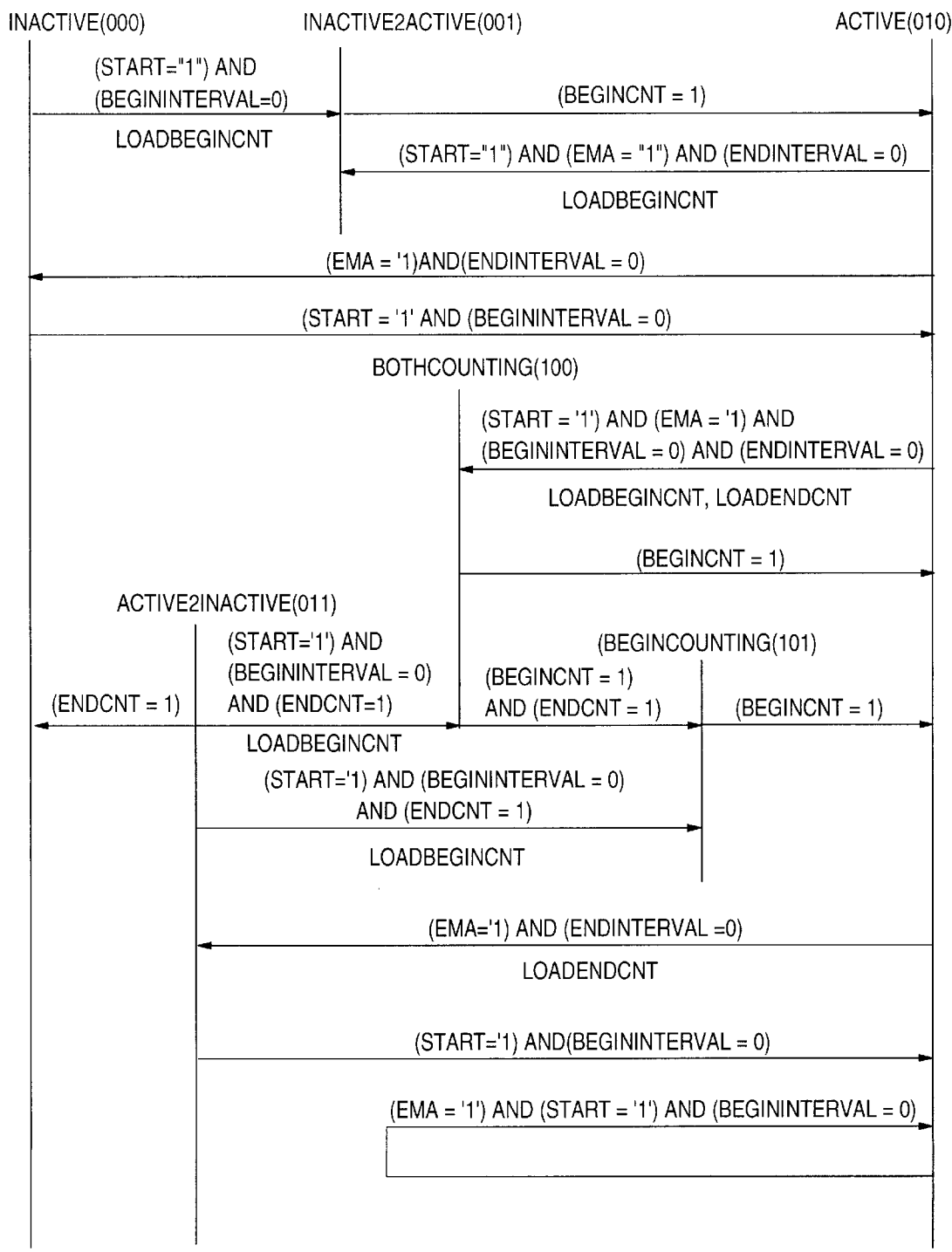
FIG. 4 is a state diagram of a control line state machine for the control signal generator of FIG. 3.

Referring to FIG. 4, the control line state machine contains six states which are Inactive, Inactive2active, Active, Bothcounting, Begincounting, and Active2inactive. The associated control line output will be inactive in the Inactive, Inactive2active, and Begincounting states and will be active in the Active, Bothcounting, and Active2inactive states.

The Inactive state is the default state. A transition from the Inactive state occurs only when "start" is equal to one (1). A transition to the Inactive2active or Active state depends upon the value of "begininterval." If "begininterval" is not equal to zero, a delay interval is desired before transitioning to the Active state. Thus, a transition to the Inactive2active occurs. At that time the value of the desired interval is loaded into the begincnt.

The state machine remains in the Inactive2active state until the begincnt is decremented to a value of one. When begin interval counter value is equal to one (1), a transition from the Inactive2active state to the Active state occurs. The transition occurs on the value of one instead of zero so that the begininterval value represents the cycle when the Active state is reached.

In the Inactive state, if start is equal to one and the begininterval is equal to zero, the Inactive2active state is bypassed and a transition from the Inactive state to Active state occurs.

Five transitions from the Active state exist. The four conditions that dictate which transition to take are "End Media Access (EMA)", start, end interval value, and begin interval value. EMA indicates that the current activity is complete, thus all five transitions from the Active state require that EMA be equal to one. Start indicates that another activity is ready to commence. End interval value indicates the interval that must occur before the control line is deactivated. The begin interval value indicates the interval that must occur before the control line is activated. First, a transition from the Active state to the Inactive2active state occurs when EMA is equal to one, start is equal to one, end interval value is equal to zero, and begin interval is not equal to zero. During the transition, the begin interval value is loaded into the begin interval counter. From the Inactive2active state, a transition back to the Active state occurs when the begin counter value is decremented to one.

Second, a transition from the Active state to the Inactive state occurs when EMA is equal to one, endinterval is equal to zero, and start is equal to zero.

Third, a transition from the Active state to the Bothcounting state occurs when the begin interval value and the end interval value are non-zero. Thus, EMA is equal to one, start is equal to one, and both begininterval and endinterval are not zero. A transition from the Bothcounting state to the Active state occurs when the begin counter value is decremented to one (1). A transition from the Bothcounting state to the Begincounting state occurs when the end counter is decremented to a value of one and the begin counter value is not equal to one (1). A transition from the Begincounting state to the Active state occurs when the begin counter is decremented to one.

Fourth, a transition from the Active state to the Active2inactive state occurs when the end interval value is not zero. Thus, EMA is equal to one, start is equal to zero, end interval is not zero, and begin interval is either zero or not zero. A transition from the Active2inactive state to the Inactive occurs when end interval is decremented to one and start is equal to zero. A transition from the Active2inactive state to the Active state occurs when start is equal to one and the begin interval value is equal to zero; otherwise, when in the Active2inactive machine state, a start value of one (1) will result in a transition to either the Bothcounting or Begincounting state if the value of endcnt is not equal to one (1) or equal to one (1), respectively.

Fifth, a transition from the Active state back to the Active occurs when the begin interval value is zero and start is one. Thus, EMA is equal to one, start is equal to one and begininterval is zero.

Figure 5:
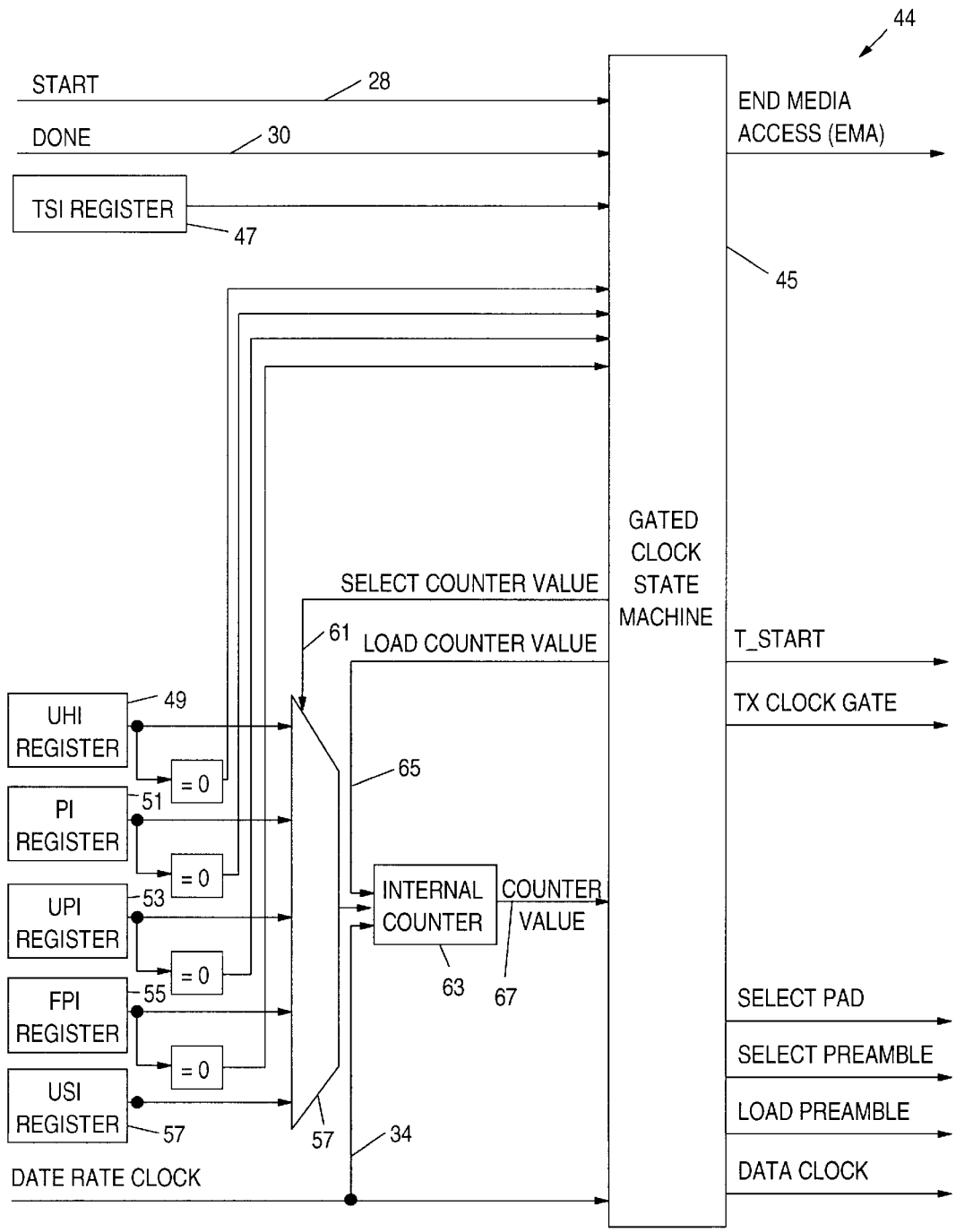
FIG. 5 is a block diagram of an output clock gating generator in the programmable output interface of FIG. 2.

Turning to FIG. 5, the output clock gating generator 44 includes a gated clock state machine 45 for generating output signals shown and described in FIG. 2. The state machine 45 is responsive to the "START" 28 and "DONE" signals 30 and a programmable Transmission Sync Interval (TSI) register 47; a User Hold Off Interval (UHI) register 49 for delaying the activation of a transmit clock and data transfer across the interface; a Preamble Interval (PI) register 51 used to insert an optional preamble sequence in the frame which enables data to be transmitted in one or more Reed-Solomon encoding blocks; a User Pause Interval (UPI) register 53 which allows the user to send data in fixed length blocks with fixed length gaps between them as indicated by the UPI; a Flush Pipeline Interval (FPI) register 55 which allows the gated clock to remain active after the end of the media access timing reference and the emptying of pipelines in the PHY hardware devices, and a User Send Interval (USI) register 57 which determines the length of the data portion of the block in the frame. Each of the registers 49–57 provides a value equals zero indication initial value to the state machine and an input to a multiplexer 59 which receives a "Select Counter Value" 61 from the state machine 45. An "interval Counter" 63 receives a first input from the multiplexer 59; a "Load Counter Value" 65 from the state machine as a second input and the data rate clock as a third input and provides a "Counter Value" 67 as an output to the state machine 45.

Figure 6:
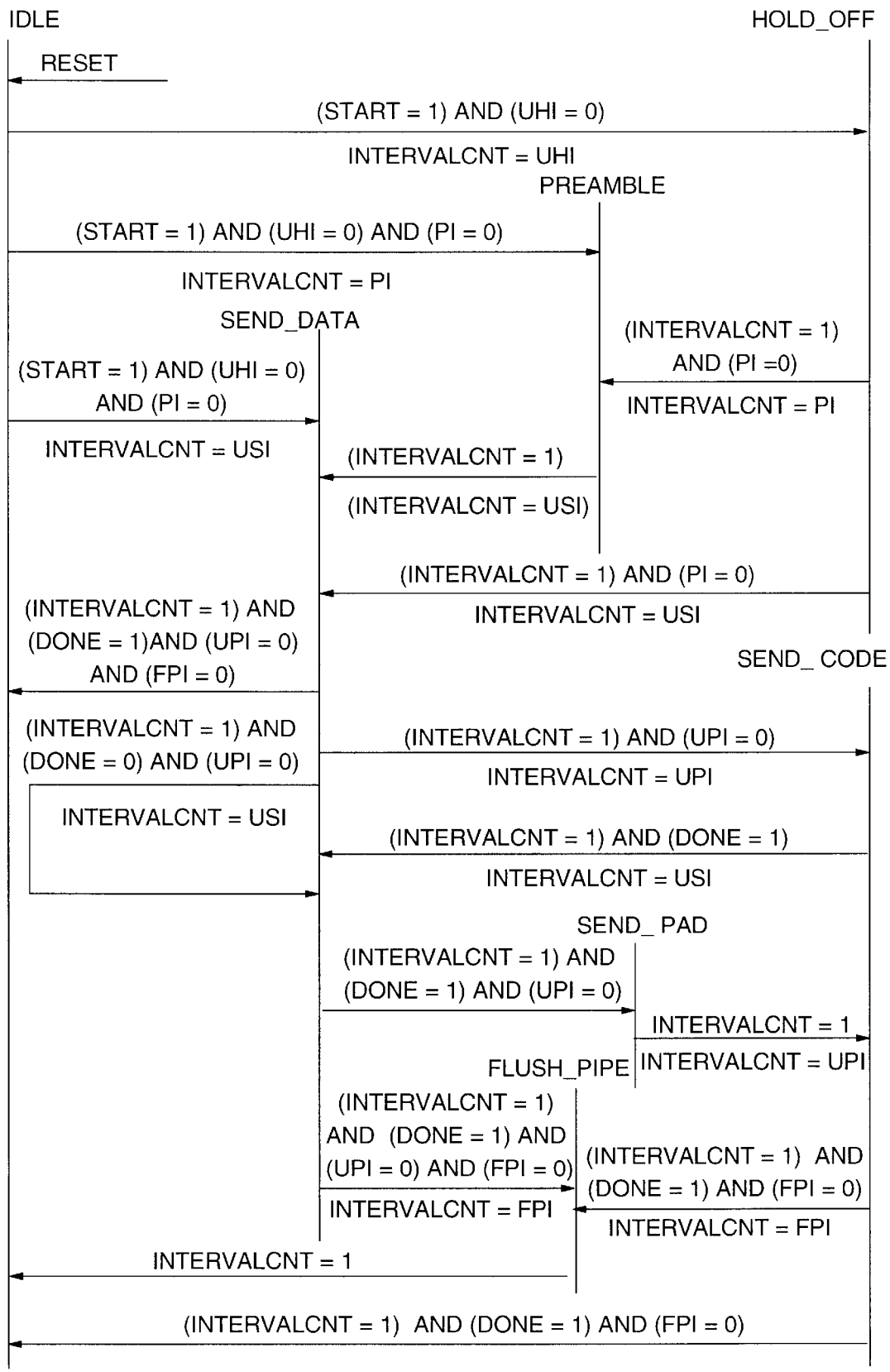
FIG. 6 is a state diagram of a gated clock state machine for the output clock gating generator of FIG. 5.

The operation of the state machine 45 will be described in conjunction with FIG. 6. The gated clock state machine 45 contains seven states. The states are Idle, Hold_Off, Preamble, Send_Data, Send_Code, Send_Pad, and Flush_Pipe. The default state is Idle and the Idle state is entered upon a reset.

Three transitions from the Idle state exist, all of which require Start is equal to one (1). First, if user hold off interval (UHI) is not zero, a transition from the Idle state to the Hold_Off state occurs. During the transition, the user hold off interval value is loaded into the interval counter (IntervalCnt). The Hold_Off state is exited when the interval counter is decremented to a value of one. If at that time the preamble interval (PI) is not zero, a transition to the Preamble state occurs and the preamble interval value is loaded into the interval counter (InterCnt). A transition from the Preamble state to the Send_Data occurs when interval counter is decremented to one. During the transition, the USI is loaded into the interval counter. If the preamble indicator is equal to zero and begin transmission is equal to one, a transition from the Hold_Off state to the Send_Data state occurs. During the transition, the USI interval value is loaded into the interval counter.

Second, if the user hold off interval is equal to zero and the preamble indicator is not zero and start is equal to one, a transition from the Idle state to the Preamble state occurs. During the transition, the preamble interval value is loaded into the interval counter. A transition from the Preamble state to the Send_Data occurs when interval counter is decremented to one. During the transition, the USI interval value is loaded into the interval counter.

Third, if both the user hold off interval value and the preamble interval value are equal to zero and start is equal to one, a transition from the Idle state to the Send_Data state occurs. During the transition, the USI value is loaded into the interval counter.

Four transitions from the Send_Data state exist. First, a transition from the Send_Data state to the Send_Code state occurs when the interval counter, which was loaded with the USI interval, is decremented to one and the UPI is not zero. During the transition, the UPI interval value is loaded into the interval counter.

Second, a transition from the Send_Data state to the Send_Pad state occurs when done is equal to one and UPI is not zero and the interval counter is not equal to one. A transition from the Send_Pad state to the Send_code state occurs when the interval counter is decremented to one. During the transition, the value of the UPI is loaded into the interval counter.

Third, a transition from the Send_Data state to the Flush_Pipe state occurs when the flush pipe interval value (FPI) is not zero, done is equal to one, the interval counter is decremented to one (1), and the UPI is zero. During the transition the flush pipe interval value is loaded into the interval counter. A transition from the Flush_Pipe state to the Idle state occurs when the interval counter is decremented to one.

Fourth, a transition from the Send_Data state to the Idle state occurs when the interval counter is decremented to one (1), the flush pipe interval value and the UPI interval value are both equal to zero and done is equal to one.

Three transitions from the Send_Code state occur when the interval counter is decremented to one. The interval counter is decrementing the UPI interval. First, a transition from the Send_Code state to the Send_Data occurs when done is not one and the interval counter is decremented to one. During the transition, the interval counter is loaded with the USI interval value.

Second, a transition from the Send_Code state to the Flush_Pipe state occurs when the flush pipe interval value is not zero, done is equal to one, and the interval counter is decremented to one. During the transition, the flush pipe interval value is loaded into the interval counter.

Third, a transition from the Send_Code state to the Idle state occurs when done is equal to one, the flush pipe interval value is zero and the interval counter decremented to one.

Figure 7:
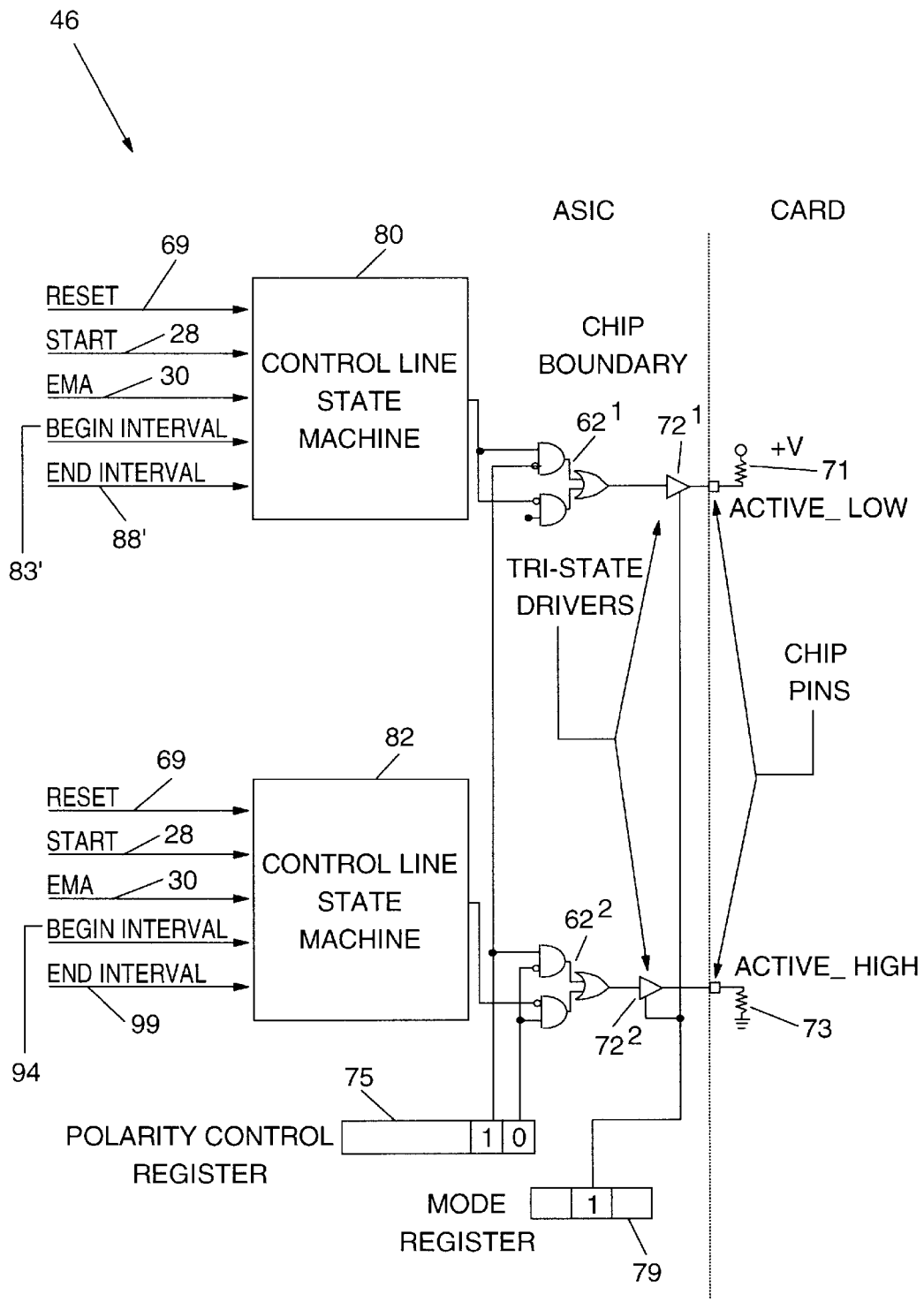
FIG. 7 is a block diagram of an output and polarity control device in the programmable output interface of FIG. 2.

Turning to FIG. 7, the output polarity control device 46 includes drivers $67^1$, $67^2$ to control polarity of the control lines generated by the state machines 80 and 82. Whenever a "RESET" signal 69 is provided as an input, the control signals associated with the programmable output interface 40 (See FIG. 2) are set to their "inactive" state and the output drivers for these signals are initialized to a high impedance state. Resistors 71, 73 should be used to pull each control signal to its "inactive" value (high or low). The "active" level (high or low) of each control line is then established by programming a polarity register 75. Once the polarity has been established, the interface 40 is enabled and the drivers 67 will determine the signal levels. The polarity control 46 also includes tristate drivers $77^1$, $77^2$ which in combination with a mode register 79 enables the interface to indicate the active "high" and active "low" values for the control signals.

Figure 8:
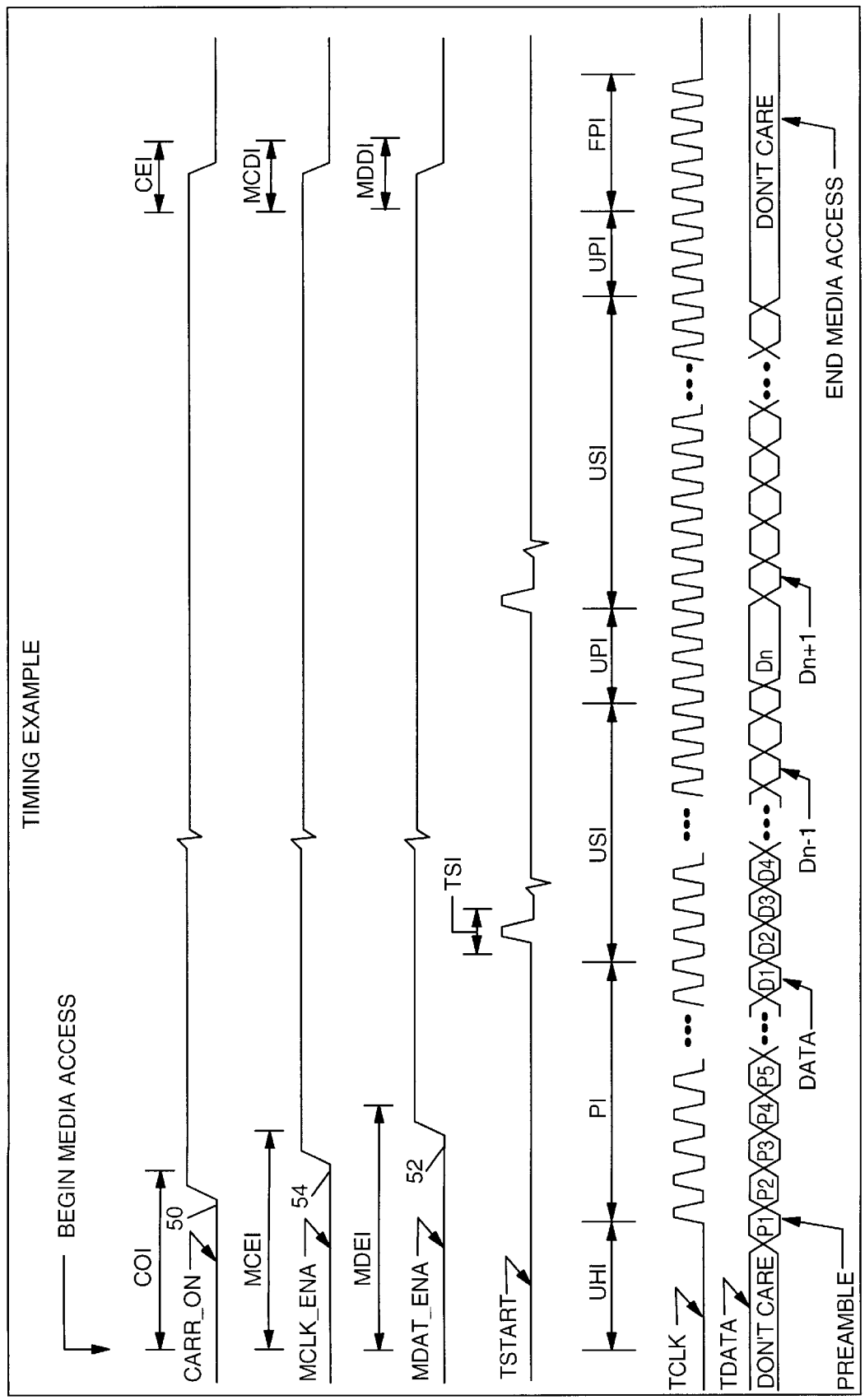
FIG. 8 is a timing diagram for transmission of data through the interface of FIG. 2 using a gated clock.

In FIG. 8, the operation of the interface 40 will be described in conjunction with FIGS. 3 and 5 with all control lines having been programmed to a high level. The "Carrier ON" signal 50 is controlled by two intervals: A Carrier On interval controlled by programmable register 81 and a Carrier Extinguish Interval controlled by programmable register 87. The Modulator Clock Enable signal 54 is controlled by two intervals: The Modulator Clock Enable Interval controlled by programmable register 100 and the Modulator Clock Disable Interval controlled by programmable register 101. The Modulator Data Enable signal 52 is controlled by two intervals: The Modulator Data Enable Interval controlled by programmable register 90 and the Modulator Data Disable Interval controlled by programmable register 91.

The transmission of data across the programmable output interface can use either a continuous clock or a gated version of the clock. Like the control lines, the polarity of the data and clock can be programmed by setting corresponding values in the polarity control register. Polarity control determines whether the positive or negative going clock edge is centered in the period when the data is valid.

In the gated version for transferring data across the interface, there are five intervals, previously described: the User Hold Off Interval (UHI); the Preamble Interval (PI); the User Send Interval (USI); the User Pause Interval (UPI); and the Flush Pipeline Interval (FPI). Each of these intervals is controlled by related registers as shown and described in connection with FIG. 5. The programmable User Hold Off Interval (UHI) register 49 delays the activation of the transmit clock and data transfers across the interface. This allows the activation of other control lines prior to data transfer. The Preamble Interval (PI) is used to insert an optional preamble sequence and is controlled by programmable register 51, at the end of which data can then be transmitted in one or more encoded blocks in an User Send Interval (USI). The length of the data portion of the block is determined by the user send interval value controlled by the programmable register 57, while the length of the code portion is determined by the User Pause Interval value which is controlled by the programmable register 53. If the user data terminates before the end of the USI, the programmable output interface will pad the data streams until the end of the USI with a pad value 76 (See FIG. 2) entered into the interface by a user. Each USI is accompanied by a TSTART pulse. This pulse is used by the encoder for synchronization. The width of the pulse is determined by the Transmission Synchronization Interval (TSI) which is controlled by programmable register 47. If the encoding block is not used, the User Pause Interval value is set to zero for continuous data transfer. The Flush Pipeline Interval (FPI) value allows the gated clock to remain active after the end of the media access timing reference. This allows the emptying of pipelines in the PHY hardware devices. The FPI is controlled by the programmable register 55.

The Transmit Data (TDATA) control line is controlled by the same interval values that control the gated transmit clock. The gated transmit clock is activated after a delay of the User Hold Off Interval. After the delay of the User Hold Off Interval, the first bit of the preamble, if it exists, or the first bit of the user data will be valid on the TDATA signal line prior to the significant transition of the gated transmit clock signal. Following the transmission of the preamble as determined by the preamble interval, the TSTART signal is activated and the first bit of user data is valid prior to the next significant transition of the gated transmit clock. Each time the TSTART signal is activated, it is active for a number of clock periods as determined by the Transition Synchronous Interval. The output interface allows the user to send data in fixed length blocks, indicated by the USI with fixed length gaps between them as indicated by the UPI. A transmission will be composed of an optional preamble, followed by one or more blocks of user data with trailing gaps of zero or more bits. Following the last UPI, the interface will also allow the gated transmit clock to continue for a number of clock periods controlled by the flush pipeline interval value. This allows the clearing of any pipeline data in the physical layer hardware.

Figure 9:
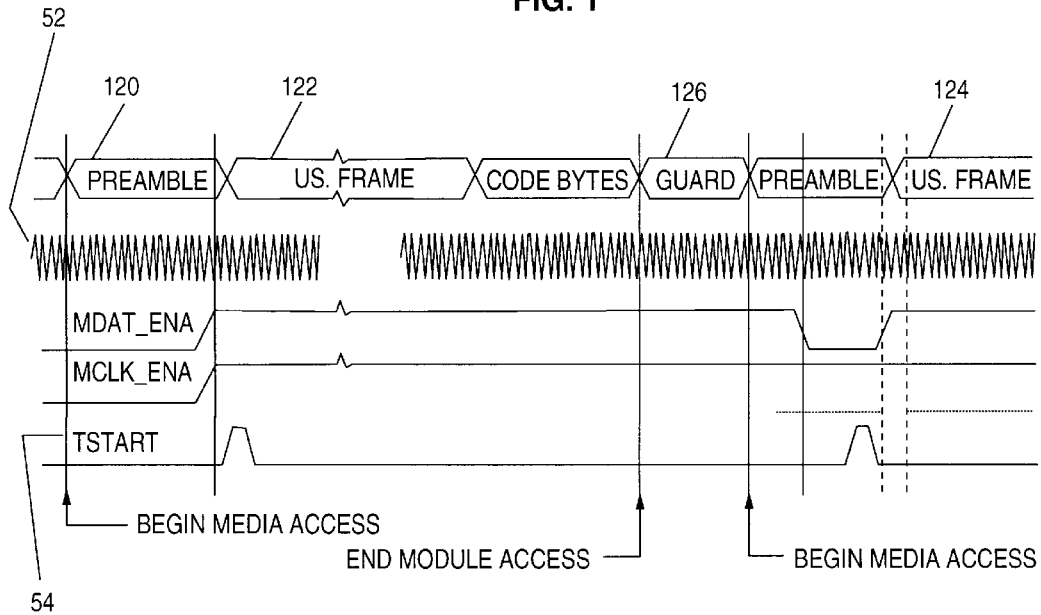
FIG. 9 is a timing diagram for transmission of data through the interface of FIG. 2 using a free-running clock.

In FIG. 9, an example of the programmable interface using a continuous or free running clock 120 now be described. FIG. 9 shows two frame transmissions 122, 124 separated by a guard interval 126. In this example, consecutive transmission bursts cause control line sequences to overlap. When this occurs, some control lines may not be deactivated for the first burst as shown for the modulator clock enable and the modulator data enable in FIG. 9. This condition exists when the number of clock cycles between the End Media Access (EMA) for the first transmission and the Start for the second transmission, plus the length of the begin interval value is less than or equal to the length of the end interval value. In that case, the control line state machine will transition from the Active state to the Active2inactive state with the end interval counter loaded with end interval value. Some time later, the Start signal becomes equal to one, and the transition is made to the Bothcounting state with the begin interval counter loaded with the begin interval value. Before the end interval counter reaches a value of one, the begin interval counter reaches a value of one and the state machine returns to the Active state waiting for the End Media access signal to equal one. If, for a subsequent transmission, the number of clock cycles between the End Media Access for the current transmission and the Start for the next transmission, plus the length of the begin interval value is greater than the end interval value, then the control line will be deactivated between transmissions. The overlapping of transmission control sequences improves the data transmission efficiency across the interface.

Summarizing, a programming output interface has been disclosed in which programmable registers control the level and timing intervals of frame elements in data transmissions across a MAC and PHY layer using either a gated or continuous running clock. The ability to alter the polarity and timing intervals of the frame elements in data transmission enables a Media Access layer to access a variety of physical layer implementations without redesign of the interface and the accompany ASIC design.

While the present invention has been shown and described in connection with a preferred element, various modifications and changes may be made therein without departing from the spirit and scope of the invention, as defined in the appended claims in which:

I claim:

1. A programmable output interface in an Open System Interconnection (OSI) enabling a Media Access Layer (MAC) to access a variety of Physical Layers (PHY) implementations in a network without redesign of the MAC, comprising:
   a) means for directly coupling the programmable interface to the MAC layer and to the PHY layer;
   b) means for transmitting data in frame sequences from the MAC layer to the interface and thence to the network;
   c) means for generating control signals in the interface for the transmission of the data in frame sequences from the MAC layer through the interface to the PHY layer;
   d) means for generating timing signals in the interface for controlling the data rate of transfer of the frame sequences through the interface; and
   e) means for adjusting the control signals and the timing signals in the interface according to the requirements of other PHY layer implementation in the network.

2. The interface of claim 1 wherein the control signals comprise a Carrier ON; a Modulator Data Enable and a Modulator Clock Enable.

3. The interface of claim 1 wherein the adjusting means comprises:
   a) programmable means for setting the interval of the control signals; and
   b) programmable means for setting the interval of the timing signals.

4. The interface of claim 1 further comprising:
   a) a polarity control device coupled to the means for providing correct signal polarity for the control signals and timing signals in transferring data through the interface to the PHY layer.

5. The interface of claim 1 further comprising;
   a) means for inserting a programmable preamble related to other control signals in a data frame transferred across the interface.

6. The interface of claim 1 further comprising:
   a) programmable registers for controlling the control signals to the PHY layer.

7. The interface of claim 1 further comprising;
   a) programmable registers for controlling the interval of various timing signals provided to the PHY layer.

8. The interface of claim 1 further comprising:
   a) state machine means for providing control and timing signal sequences to the PHY layer in response to input signals from the means for adjusting the control and timing signals.

9. The interface of claim 1 further comprising:
   a) counting means for setting control and timing intervals in response to the means for adjusting the control and timing signals.

10. The interface of claim 1 wherein the means for generating control signals comprises:
    a) programmable registers coupled to a state machine and to counting means providing an interval value to the state machine.

11. The interface of claim 1 wherein the means for generating timing signals comprises:
    a) programmable registers coupled to a state machine and to a counting means providing an interval value to the state machine.

12. The interface of claim 1 wherein the means for adjusting the control and timing signals comprises:
    a) program instructions loaded into programmable registers for setting control and timing signal intervals.

13. The interface of claim 1 further comprising:
    a) a free running or a gated clock for movement of data across the interface.

14. A programmable output interface in an Open System Interconnection (OSI) directly coupled to a MAC layer and to a PHY layer in a network including a control signal generator, an output clock gating generator, the control signal generator and clock gating generator coupled to a polarity control device, a method enabling a Media Access Layer (MAC) to access a variety of Physical Layers (PHY) implementations in the network without redesign of the MAC, comprising:
    a) transmitting data in frame sequences to the MAC layer;
    b) generating programmable control signals in the interface for the transmission of the data in frame sequences from the MAC layer through the interface to the PHY layer;
    c) generating programmable timing signals in the interface for controlling the data rate of transfer through the interface; and
    d) adjusting the control signals and the timing signals in the interface according to the requirements of other PHY layer implementations in the network.

15. The method of claim 14 further comprises the step of:
    a) setting the interval of the control signals using programmable control registers; and
    b) setting the interval of the timing signals using programmable timing registers.

16. The method of claim 14 further comprising the step of: interface of claim 1 further comprising;
    a) inserting a preamble in a data frame transferred across the interface using a programmable preamble register.

17. The method of claim 14 further comprising the step of:
    a) controlling the control signals to the PHY layer using programmable control registers.

18. The method of claim 14 further comprising the step of:
    a) controlling the interval of various timing signals provided to the PHY layer using programmable timing registers.

19. The method of claim 14 further comprising the step of: interface of claim 1 further comprising:
   a) providing control and timing signal sequences to the PHY layer using state machine responsive to input signals from the control and timing signal generators.

20. The method of claim 14 further comprising the step of: interface of claim 1 further comprising:
   a) setting control and timing intervals in response to state machines.

21. The method of claim 14 further comprising the step of:
   a) providing an interval value to a state machine using programmable registers coupled to the state machine and to counting means.

22. The method of claim 14 further comprising the step of:
   a) setting an active or inactive state for the control signals in response to an output signal from a state machine; and
   b) determining the active or inactive state of the driver means using a programmable polarity control register.

23. The interface of claim 1 embodied in an integrated circuit.

24. A programmable output interface in an Open System Interconnection (OSI) enabling a Media Access Layer (MAC) to access a variety of Physical Layers (PHY) implementations without redesign of the interface, comprising:
   a) means for transmitting data in frame sequences to the interface;
   b) means for generating control signals for the transmission of the data in frame sequences from the MAC layer through the interface to the PHY layer, the control signals comprising a Carrier ON; a Modulator Data Enable and a Modulator Clock Enable;
   c) means for generating timing signals for controlling the data rate of transfer through the interface, the timing signals comprising a gated transmit clock; an end media access; a TStart; a select pad; a select preamble; a load preamble and a data clock; and
   d) means for adjusting the control signals and the timing signals according to the requirements of the PHY layer implementation.

25. A programmable output interface in an Open System Interconnection (OSI) enabling a Media Access Layer (MAC) to access a variety of Physical Layers (PHY) implementations without redesign of the interface, comprising:
   a) means for transmitting data in frame sequences to the interface;
   b) means for generating control signals for the transmission of the data in frame sequences from the MAC layer through the interface to the PHY layer;
   c) means for generating timing signals for controlling the data rate of transfer through the interface;
   d) a polarity control device coupled to the means for generating control signals and the means for generating timing signals, the polarity control device comprising:
      i) driver means for setting an active or inactive state for the control signals in response to an output signal from a state machine;
      ii) programming means for determining the active or inactive state of the driver means; and
   e) means for adjusting the control signals and the timing signals according to the requirements of the PHY layer implementation.

26. A programmable output interface in an Open System Interconnection (OSI) including a control signal generator, an output clock gating generator, the control signal generator and clock gating generator coupled to a polarity control device, a method enabling a Media Access Layer (MAC) to access a variety of Physical Layers (PHY) implementations without redesign of the interface, comprising:
   a) transmitting data in frame sequences to the interface;
   b) generating control signals for the transmission of the data in frame sequences from the MAC layer through the interface to the PHY layer,
   c) generating timing signals for controlling the data rate of transfer through the interface;
   d) setting the interval of the timing signals using programmable timing registers;
   e) adjusting the control signals and the timing signals according to the requirements of the PHY layer implementation; and
   f) setting the polarity of the control signals using a polarity control device coupled.

* * * * *